Figure 1:
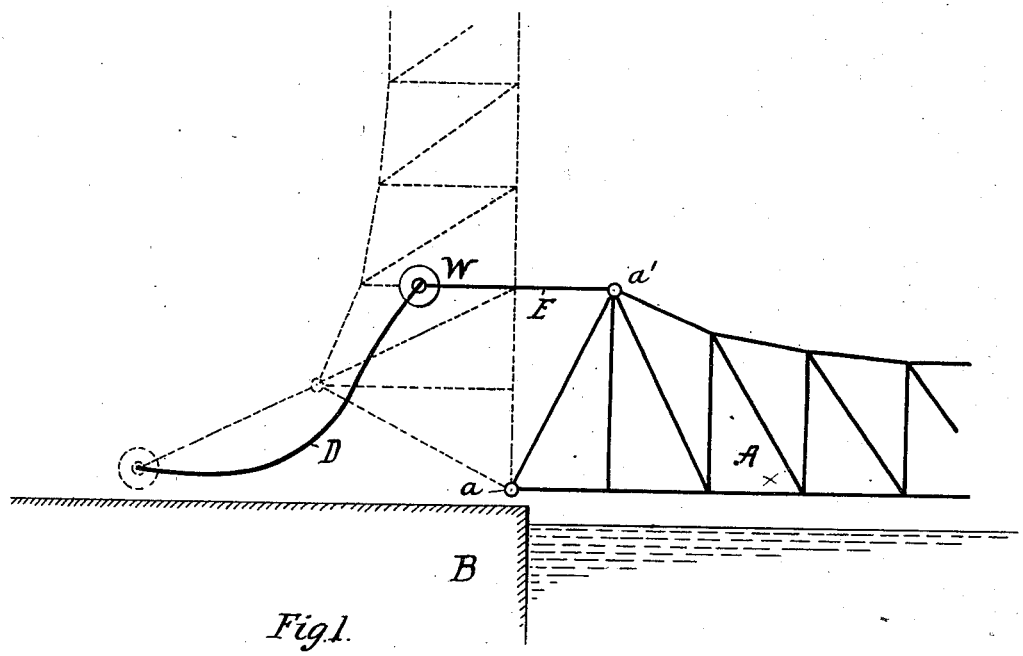

No. 660,827. Patented Oct. 30, 1900.
M. WADDELL.
BRIDGE.
(Application filed Mar. 4, 1899.)

(No Model.) 3 Sheets—Sheet 1.

WITNESSES:
Frank S. Ober
Geo. S. Kennedy

INVENTOR
Montgomery Waddell
BY
M. Rosenbaum
ATTORNEY

THE NORRIS PETERS CO., PHOTO-LITHO., WASHINGTON, D. C.

No. 660,827. M. WADDELL. Patented Oct. 30, 1900.
BRIDGE.
(Application filed Mar. 4, 1899.)
(No Model.) 3 Sheets—Sheet 2.
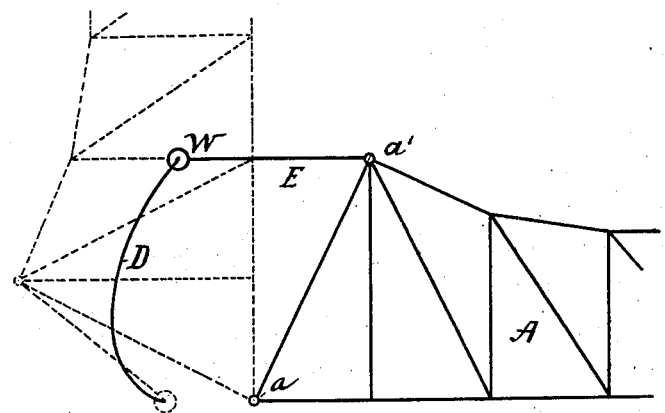
Fig. 3.
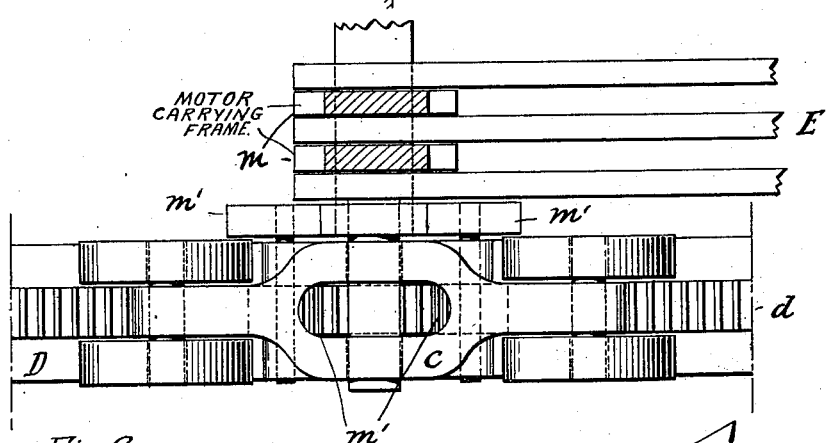
Fig. 6.
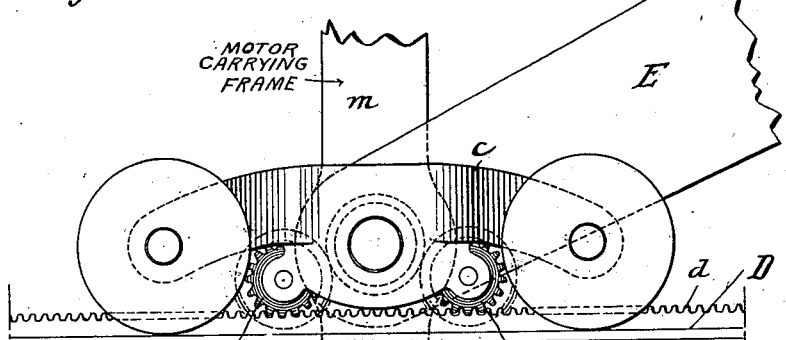
Fig. 7.
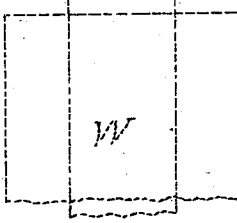
WITNESSES: Geo. S. Kennedy. Frank S. Ober.
INVENTOR Montgomery Waddell
BY W. A. Rosenbaum
ATTORNEY
THE NORRIS PETERS CO., PHOTO-LITHO., WASHINGTON, D. C.

No. 660,827. Patented Oct. 30, 1900.
M. WADDELL.
BRIDGE.
(Application filed Mar. 4, 1899.)
(No Model.) 3 Sheets—Sheet 3.

WITNESSES:
Geo. S. Kennedy.
Frank S. Ober.

INVENTOR
Montgomery Waddell
BY
Wm A. Rosenbaum
ATTORNEY

UNITED STATES PATENT OFFICE.

MONTGOMERY WADDELL, OF NEW YORK, N. Y.

BRIDGE.

SPECIFICATION forming part of Letters Patent No. 660,827, dated October 30, 1900.

Application filed March 4, 1899. Serial No. 707,720. (No model.)

*To all whom it may concern:*

Be it known that I, MONTGOMERY WADDELL, a subject of the Queen of Great Britain, residing at the city of New York, borough of Manhattan, State of New York, have invented certain new and useful Improvements in Bridges, of which the following is a full, clear, and exact description.

This invention relates to opening bridges of that type in which the moving span or section swings on a horizontal axis through a vertical plane and in which counterweights are commonly used to balance the weight of the bridge and to lessen the work entailed upon the motive power. My invention has special reference to the counterbalancing of the bridge and comprehends what I believe to be a new principle of construction and operation. More or less successful efforts have heretofore been made to arrange and operate the counterweight in such a way that as the center of gravity of the moving bridge approaches or recedes from the vertical plane of its axis the balancing effect of the counterweight will correspondingly alter and thereby provide for the balancing of the bridge at all points of its travel. My invention accomplishes this result, but in what I believe to be a novel manner.

The bridge as a whole consists of four principal elements—viz., the movable bridge-span, a counterweight, a guide or track directing the path of movement of the counterweight, and a connector between the counterweight and the movable bridge. The connector to which the weight is attached is hinged to the bridge at one end and bears against the guide at its other end. The slope of the guide at every point is such that it causes the counterweight when there to produce a force in the connector equal and opposite to that produced by the weight of the bridge itself, and thus maintain conditions of balance. In certain forms of this bridge this force is greater than that produced by gravity acting on the counterweight, and this ability of the counterweight by the action of the guide to balance a force greater than that produced in itself is an important feature of my invention.

The invention is illustrated in the accompanying drawings, wherein the principal figures are conventional illustrations.

Figure 2:
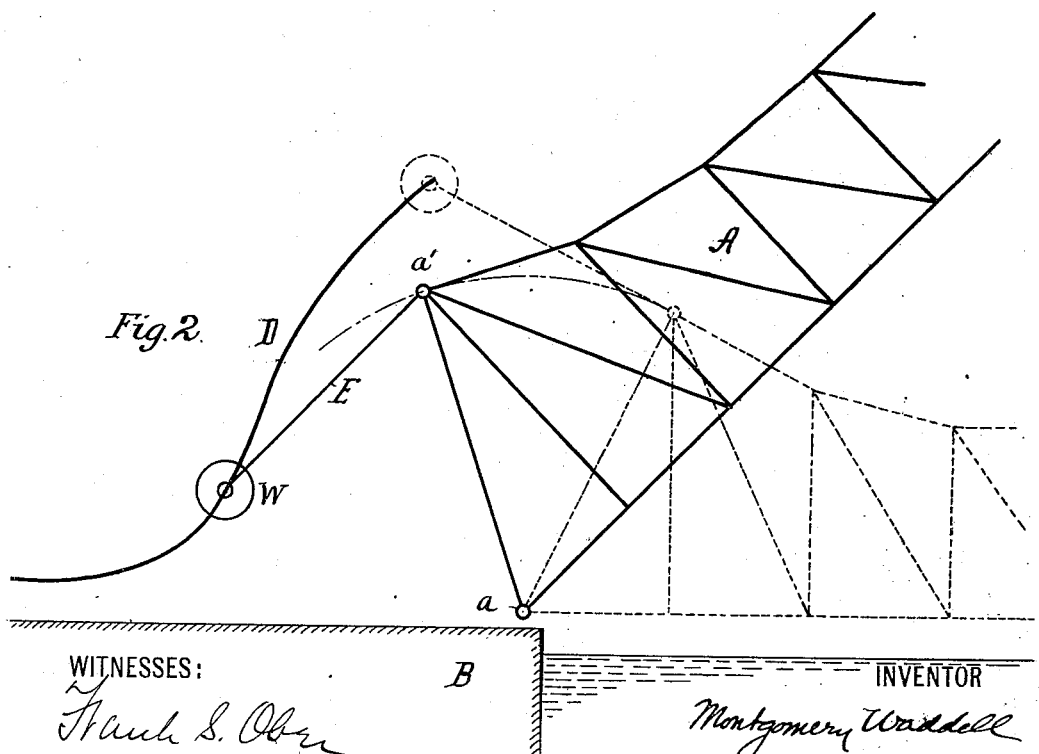
Figure 4:
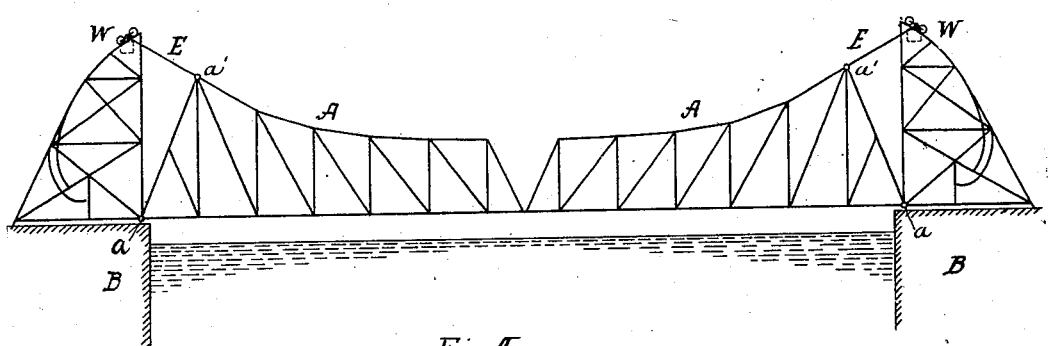
Figure 5:
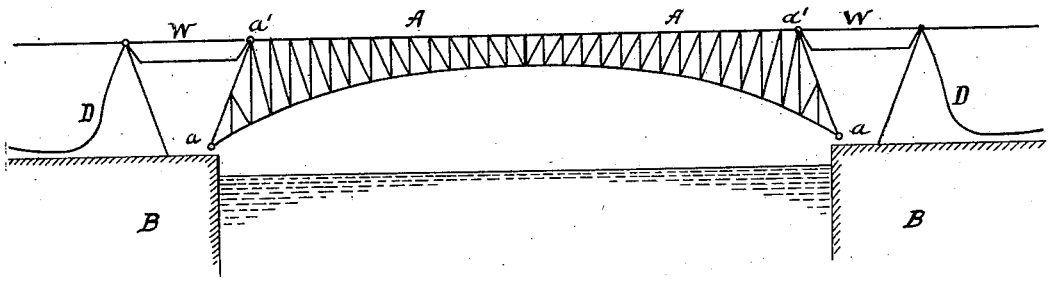

Figure 1 is a side elevation of one form of the improved bridge shown in its closed position, the open position being indicated in dotted lines. Fig. 2 shows a slightly-modified form of bridge, the moving span being partially open. Fig. 3 is a similar view of the bridge arranged with a guide incurving toward the pivot. Fig. 4 is a side elevation of a two-leaf bridge operated with incurving guides. Fig. 5 is a side elevation of an arch-bridge, showing the modified disposition of the counterweights; and Figs. 6 and 7 represent, respectively, a plan and a side elevation of the truck carrying the counterweight and to which the connector is attached, also showing the gearing through which the bridge may be moved.

The movable span is indicated by A. It is adapted to swing upon a horizontal axis located at $a$ upon a pier B.

W is a counterweight which may be greater than, equal to, or less than the weight of the movable span of the bridge.

D is a guide which determines the direction of the opposing forces produced by the bridge and its counterweight.

The counterweight W is connected to the bridge by an arm E, which may be either flexible or rigid under most conditions; but in certain forms of my bridge to be hereinafter referred to it must be rigid. The connection between the counterweight and the arm is ordinarily a pivotal one, as is also the connection between the arm and the bridge, and the point at which the arm takes hold of the bridge is preferably at the hip or corner $a'$ above its axis; but this connection may be at any point outside of the axis of the span, which may be determined by good engineering practice.

It will be understood that a suitable structure will be provided upon the pier for the support of the guide D and that one or more guides, counterweights, and arms may be used for each moving span of the bridge. In some cases—for instance, as is shown in Fig. 4—this superstructure may take the form of a low tower.

The motive power by which the bridge is moved may be applied in any desired manner; but the motor is preferably mounted at or near the guided end of the arm. In this way its weight becomes useful as a portion of the balancing force. The construction in detail is illustrated in Figs. 6 and 7, wherein it will be seen that a truck c runs upon the guide D, and to this is pivoted a frame m, extending above and below. The counterweight W is carried on the lower end of the frame, while the motor is supported at the upper end, but not shown in the drawings. The arm E connects with the center of the truck, and suitable gearing m', driven by the motor, engages a rack d, following the course of the guide.

It is well known that a weight free to move in a given direction can be balanced by a force acting in the opposite direction and equal in amount to the force exerted by the weight in the direction in which it is free to move; but if such opposing force act in any other direction it must be increased in amount, depending upon the angle between the direction of the force and the direction in which the weight is free to move. Applying this principle to the counterbalancing of a bridge, it is found that by progressively and properly shifting the direction of the force created by the weight of the bridge such force will equally oppose that exerted by the counterweight in all positions of the bridge. Hence in designing my bridge with any known weights of span and counterweight it is only necessary to plot the course of the guide from end to end, so that the weight which travels along it and to which the weight of the bridge is opposed will be shifted to change the angle through which the weight of the bridge acts upon it in all positions of the moving span to bring about a balance between the bridge and counterweight, the fact of the varying effect of gravity upon the counterweight, due to changes in the incline of the guide, being also taken into account. Thus ordinarily when a span is in its closed position it is opposing its maximum force to the counterweight. Accordingly the arm through which the force acts should then most nearly approach a position at right angles to the tangent to the guide where the weight is located, and this is the case, as will be observed, in the bridges illustrated in the drawings. Likewise as the bridge rises and its center of gravity approaches the vertical above the axis the effect of its weight upon the counterweight grows less and less, and the guide is accordingly deflected to bring the arm more into a tangential position when the lessening weight of the bridge will not be overbalanced by the counterweight. This will be clear upon comparing Figs. 1 and 2. It will also be found, as shown in Figs. 3 and 4, that under some conditions the guide D may curve inward, thus allowing for a smaller structure. As shown in Fig. 1, the lower end of the guide may turn upward to resist a tendency of the bridge to fall backward when the center of gravity of the bridge passes beyond the vertical. In this case the arm must be rigid, as compression will then be created in it. It may be pointed out here that in those forms of the bridge where a flexible connector is used there may be times when the connector will sag or will be otherwise deflected from the straight line between its two points of connection; but in any case it is an essential feature that the distance between the two points of connection shall remain constant in any bridge.

An important advance in the development of this bridge is shown in Figs. 3 and 4, where it will be seen that the connecting-arm is inclined upward from the bridge when the bridge is closed, thus permitting a greater fall of the counterweight; or if the fall be already determined upon the inclining of the arm allows the hip of the truss where it is hinged to be made lower.

In Fig. 5 the counterweight is disposed differently from the arrangements before described. Instead of all being centered at or upon the guide it is distributed along the arm, thus making it of larger dimensions, which may be taken advantage of by forming it into a truss supporting a part of the deck or roadway of the bridge, as shown. The extremity of the truss connects with the truck on the guide, as before.

Having described my invention, I claim—

1. In a vertically-swinging bridge, a counterweight, a guide for the counterweight, a truck movable thereon, a connector between the truck and the bridge, a frame pivoted to the truck, and a motor mounted on said frame on one side of its pivot, substantially as described.

2. In a vertically-swinging bridge, a guide for the counterweight, a truck movable thereon, a connector between the truck and the bridge, a frame pivoted to the truck, and a motor and a weight mounted on said frame, substantially as described.

3. In a vertically-swinging bridge, the combination of the swinging span, a track or guide and a direct connector having one of its ends pivoted to the span and the other in movable contact with the said guide, said connector carrying a part of the roadway of the said bridge.

4. In a vertically-swinging bridge, the combination of the swinging span, a track or guide, a direct connector having one of its ends pivoted to the span and the other in movable contact with the said guide, said connector carrying a part of the roadway of the said bridge, and a counterweight also carried by said connector, substantially as described.

5. In a vertically-swinging bridge, the combination of the swinging span, a track or guide and a direct connector having one of its ends pivoted to the span and the other in movable contact with the said guide, said connector constituting the bridge-counterweight, substantially as described.

6. In a vertically-swinging bridge, the combination of the swinging span, a track or guide, and a direct connector having one of its ends pivoted to the span and the other in movable contact with the said guide, the guide being directed inward toward the swinging span, substantially as described.

In witness whereof I subscribe my signature in presence of two witnesses.

MONTGOMERY WADDELL.

Witnesses:
WM. A. ROSENBAUM,
FRANK S. OBER.